(12) United States Patent
Hsiao

(10) Patent No.: US 6,502,612 B2
(45) Date of Patent: Jan. 7, 2003

(54) INTEGRAL SOLID TIRE

(76) Inventor: Chai-I Hsiao, No. 243, Park Rd., Tien Chung Chen, Chang Hwa Hsien (TW)

( * ) Notice: Subject to any disclaimer, the term of this patent is extended or adjusted under 35 U.S.C. 154(b) by 3 days.

(21) Appl. No.: 09/810,614

(22) Filed: Mar. 19, 2001

(65) Prior Publication Data

US 2001/0011568 A1 Aug. 9, 2001

Related U.S. Application Data

(63) Continuation-in-part of application No. 09/460,406, filed on Dec. 13, 1999.

(51) Int. Cl.[7] .................................................. B60C 25/00
(52) U.S. Cl. ........................................ 152/393; 152/323
(58) Field of Search ................................ 152/393, 323, 152/325, 326, 328, 329, 394, 112, 113, 246; 156/112, 113, 114; 425/28.1

(56) References Cited

U.S. PATENT DOCUMENTS

| | | | | |
|---|---|---|---|---|
| 844,821 A | * | 2/1907 | Marks | 152/393 |
| 1,237,227 A | * | 8/1917 | Swartz | 152/324 |
| 1,823,566 A | * | 9/1931 | Maranville | 152/113 |
| 2,709,471 A | * | 5/1955 | Smith et al. | 152/323 |
| 3,949,796 A | * | 4/1976 | Bartos | 152/158 |
| 4,940,445 A | * | 7/1990 | DesPortes | 152/323 |
| 5,073,444 A | * | 12/1991 | Shanelac | 152/112 |
| 5,246,985 A | * | 9/1993 | Saito et al. | 152/209.7 |
| 5,788,786 A | * | 8/1998 | Yamauchi et al. | 152/209.7 |
| 6,021,831 A | * | 2/2000 | Yamauchi et al. | 152/209.7 |
| 6,286,907 B1 | * | 9/2001 | Meader | 152/393 |

* cited by examiner

Primary Examiner—S. Joseph Morano
Assistant Examiner—Long Bao Nguyen
(74) Attorney, Agent, or Firm—Rosenberg, Klein & Lee

(57) ABSTRACT

An integral solid tire is formed with an outer section and an inner foam section. The inner side portion of the outer section comprises a number of layers with one portion integrating to the inner portion of the outer section. When sulfur is added to the outer section for processing, the inner foam section is integrally formed in the inner of the outer section by means of heating and pressure process, and the inner foam section is integral with the other portion of the layers of the outer section. In other words, the inner foam section is integral with the outer section, this design has a low density at the center and gradually increases towards outside in a radius state which has a better shock absorption.

3 Claims, 3 Drawing Sheets

INTEGRAL SOLID TIRE

CROSS-REFERENCE TO RELATED APPLICATION

This is a Continuation-in-Part of abandoned U.S. patent application Ser. No. 09/460,406 filed at the U.S. Patent and Trademark Office on Dec. 13, 1999.

BACKGROUND OF THE INVENTION

1. Field of the Invention

This invention relates to an integral solid tire, and more particularly to a tire having a low density at center portion, and the density gradually increases towards the outer surface.

2. Prior Art

The current tires on the market are in two categories, one is an inflate tire and the other is a solid tire. The inflate tire although has a good bouncing and shock absorption character, the tire can not take heavy load or it will explode easily. The solid tire refers to the one which is designed to a heavy duty kind and especially to be used on a special circumstance, such as a steel factory or so on which is able to prevent poke by sharp objects.

A solid tire 10, as shown in FIG. 1, is formed with rubber which is capable of carrying heavy load, but it has some shortcomings, for instance:

(1) The tire is lack of bouncing character, thus it is easy to crack and can not absorb the vibration from an uneven ground, and may even damage the shock absorber.

(2) This design is to place rubbers into the mold and heated with high temperature, which requires large quantity of rubber and takes more time in produce, thus, it increases the cost of production.

(3) The tire is heavy, which requires more fuel to consume.

The conventional tire structure as cited prior arts, such as U.S. Pat. Nos. 3,866,652, 4,530,386, 4,909,972, 5,073,444, 5,685,952 and 5,922,151 were mostly using an outer section to wrap an inner elastic section or an inner foam section. The inner foam section is either a different entity or different material from the outer section, thus, the character is different as well. After a certain period of consuming time, the outer section and the inner foam section will shift from each other and even peer off, which is neither safe nor durable. It also requires two different procedures in manufacture.

SUMMARY OF THE INVENTION

It is the primary object of the present invention to provide an integral solid tire, which has a good bouncing character and can absorb most of the vibration, and will not easily crack.

It is another object of the present invention to provide an integral solid tire, which simplifies the production procedure, such reduces the manufacture cost.

It is another object of the present invention to provide an integral solid tire, which uses foam material as the inner section which is light in weight, thus, it decreases the weight and saves the fuel and decreases the air pollution as well.

DETAILED DESCRIPTION OF THE PREFERRED EMBODIMENT

Figure 1:
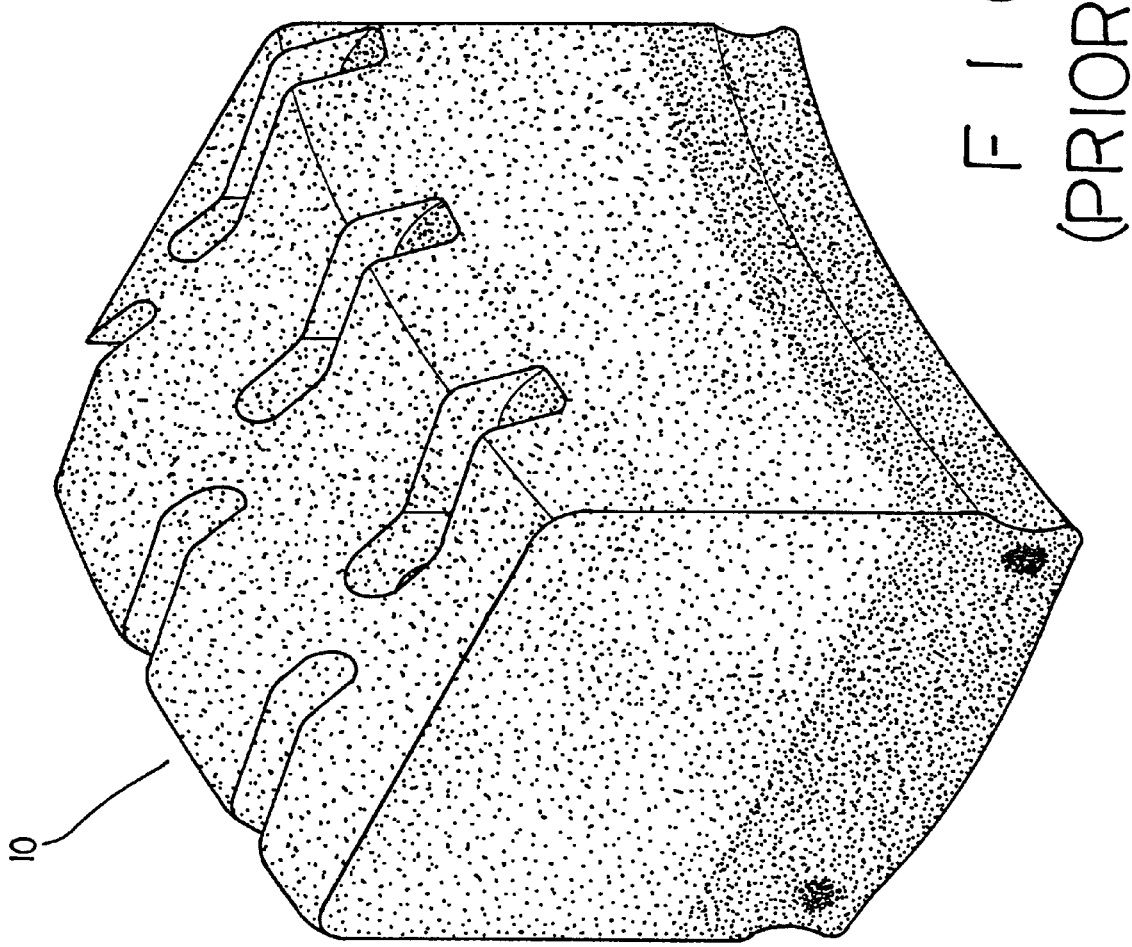
FIG. 1 is a perspective view of the tire of a prior art.
Figure 2:
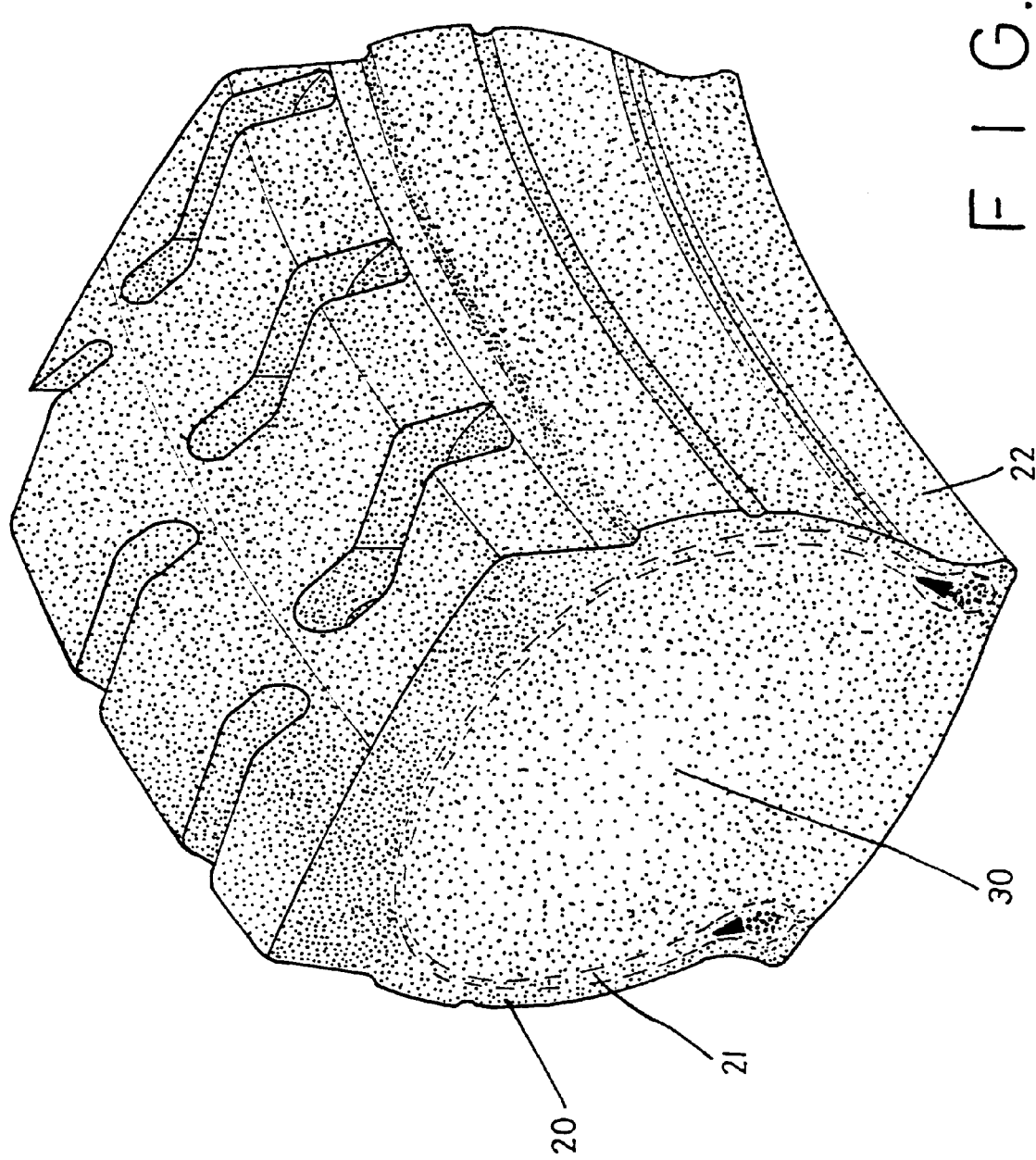
FIG. 2 is a perspective view of the present invention.

The solid tire of the present invention, as shown in FIG. 2, comprises an outer section 20 and an inner foam section 30. The outer section 20 has a number of layers 21 attached at one portion to the inner surface of the outer section 20. When sulfur is added to the outer section 20 in a mold for processing, the inner foam section is integrally formed in the inner of the outer section 20 by means of heating and pressure process, and is integral with the portion of the layers 21 of the outer section 20. The inner foam section 30 is formed with the outer section 20 to form the entire tire. The inner foam section 30 has a density which is low at center and gradually increases towards outside in a radius state.

The present invention is an integral tire and the manufacture procedure, which is to form the outer section 20 and the inner foam section 30 together. There are a number of layers 21 in between the outer section 20 and the inner foam section 30, and wherein the outer section 20 is composed of 80% of the natural rubber and 20% of synthetic rubber, while the inner foam section 30 is composed 60% of the natural rubber and 40% of synthetic rubber. Foam media is added to the inner foam section 30 in accordance with the size of the tire, the inner foam section 30 is then placed in between an outer mold and an inner mold and heated to form the tire. The quality of the foam is selected depending on the heating temperature, the low temperature foam reacts at a low temperature whereas high temperature foam reacts at a higher temperature. Therefore, temperature can cause different results with respect to different foams, with this character, the present invention is combined the low temperature foam, referred as to foam media A and the high temperature foam, referred as to polyurethane media B together. One embodiment of the present invention is to divide the inner foam section 30 into three sections, each of which is added with the combination of the foam media A and the foam media B in a different proportions, which is as follows:

Center section, the proportion of the foam media A and the foam media B is 3 to 1;

Second section, the proportion of the foam media A and the foam media B is 1 to 2; and Outer section, the proportion of the foam media A and the foam media B is 1 to 2.

Upon the inner foam section 30 is placed in between the outer mold and the inner mold, the outer mold is heated with a temperature of 140 through 165 Centigrade and the inner mold is heated with a temperature of 120 through 135 Centigrade. With these different temperature sets, the density of the inner foam section 30 gradually increases towards outside in a radius state and is integral with the outer section 20 through the layers 21. The heating time depends on the size of the tire.

Figure 3:
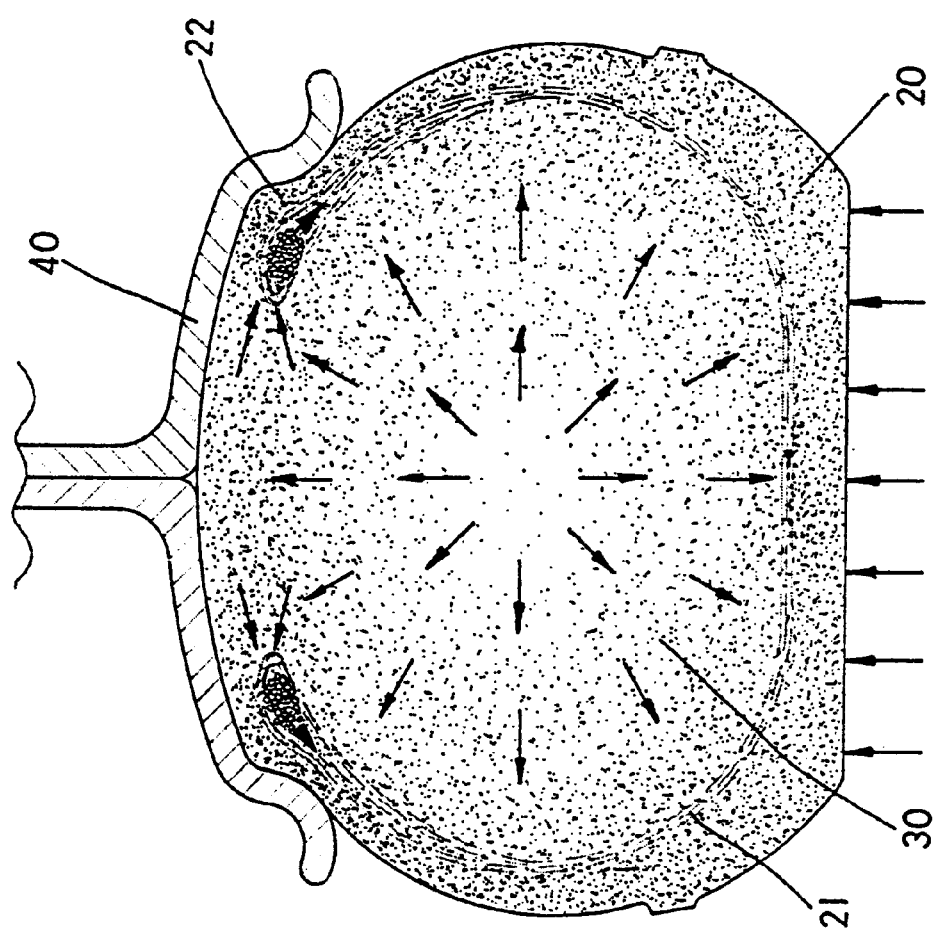
FIG. 3 is a front-sectioned view of the present invention, showing a pressure being applied to the tire.

As shown in FIG. 3, the arrows represent press against the tire. When the tire is mounted to a wheel axle 40 and is under pressure from a vehicle, the density increases from the center to the outer surface of the inner foam section 30 in a radius state, which shall absorb the vibration of the tire to provide a best shock absorption. The tire produces a higher strength of a tire lip 22 which prevents a loose situation occur.

From the above, one can understand that the inner foam section 30 is integrally formed with the outer section 20 by a heating process, which prevents the tire from cracking and absorbs the vibration the most. The integral outer section 20 and the inner foam section 30 design has simplified the manufacture process, and also due to a low cost of foam material, the manufacture cost is dropped significantly; further, the weight has dropped, thus, it consumes less fuel and minimizes the pollution possibility.

While there has been described and illustrated one specific embodiment of the invention, it will be clear that variations in the details of the embodiment specifically illustrated and described may be mad without departing from the true spirit and scope of the invention as defined in the appended claims.

I claim:

1. A integral solid tire comprising an outer section and an inner foam section, said outer section including a plurality of layers with one portion integrating to an inner portion of said outer section, and the improvements comprising:

sulfur added to said outer section in a mold for processing, said inner foam section being integrally formed by means of a heating and pressure process, and being integral with another portion of said layers of said outer section, said inner foam section being formed by a combination of a first foam media composition and a second foam media composition, said inner foam section comprises three different sections: a center section having a proportion of 3 to 1 of said first foam media composition with respect to said second foam media composition; a second section having a proportion of 1 to 1 of said first foam media composition with respect to said second foam media composition; and an outer section having a proportion of 1 to 2 of said first foam media composition with respect to said second foam media composition.

2. An integral solid tire comprising an outer section and an inner foam section, wherein said outer section comprising a number of layers with one portion integrating to the inner portion of said outer section, and the improvements comprising:

said outer section being composed of 80% of natural rubber and 20% of synthetic rubber while said inner foam section composed of 60% of natural rubber and 40% of synthetic rubber and added with a foam media A of a low temperature foam and a foam media B of a high temperature foam being placed in between an outer mold and an inner mold, said outer mold being heated with temperature between 140 through 165 Centigrade and said inner mold being heated with temperature of 120 through 135 Centigrade, said inner foam section being integral with another portion of said lays of said outer section.

3. The integral solid tire as recited in claim 2, wherein said inner foam section comprises three sections; a center section comprising a combination of 3:1 of said foam media A with respect to said foam media B, and a second section comprising a combination of 1:1 of said foam media A with respect to said foam media B, while an outer section comprising a combination of 3:1 of said foam media A with respect to said foam media B.

* * * * *